US007631767B2

(12) United States Patent
May et al.

(10) Patent No.: US 7,631,767 B2
(45) Date of Patent: Dec. 15, 2009

(54) MOULDING COMPOSITION

(75) Inventors: Donald Bruce May, Upwey (AU); Sharon May, Upwey (AU)

(73) Assignee: Glenda Fay Bell, Victoria (AU)

( * ) Notice: Subject to any disclaimer, the term of this patent is extended or adjusted under 35 U.S.C. 154(b) by 496 days.

(21) Appl. No.: 10/497,301

(22) PCT Filed: Nov. 28, 2002

(86) PCT No.: PCT/AU02/01648
§ 371 (c)(1),
(2), (4) Date: Jun. 1, 2004

(87) PCT Pub. No.: WO03/045655
PCT Pub. Date: Jun. 5, 2003

(65) Prior Publication Data
US 2005/0042340 A1 Feb. 24, 2005

(30) Foreign Application Priority Data
Nov. 29, 2001 (AU) .................... PR9206

(51) Int. Cl.
*B03C 1/00* (2006.01)
(52) U.S. Cl. .................. 209/215; 209/236
(58) Field of Classification Search ........... 209/213, 209/214, 215, 636
See application file for complete search history.

(56) References Cited

U.S. PATENT DOCUMENTS

| | | | | |
|---|---|---|---|---|
| 3,160,583 A * | 12/1964 | Stem | ............... | 209/223.1 |
| 4,225,047 A * | 9/1980 | Grubman | ............... | 209/544 |
| 5,051,034 A * | 9/1991 | Goodman | ............... | 405/157 |
| 5,346,714 A | 9/1994 | Peters | | |
| 5,453,291 A | 9/1995 | Sasahara et al. | | |
| 6,177,113 B1 | 1/2001 | Kress et al. | | |
| 2005/0236407 A1* | 10/2005 | Aisenbrey | ............... | 219/730 |

FOREIGN PATENT DOCUMENTS

| | | |
|---|---|---|
| EP | 0 670 172 | 9/1995 |
| EP | 1 072 316 | 1/2001 |
| GB | 2 261 833 | 6/1993 |
| WO | WO 97/13582 | 4/1997 |

OTHER PUBLICATIONS

Derwent Abstract Accession No. 90409B/50, classes A23, E31 JP 54-142274 A (Misubishi Electric Corp) Nov. 6, 1979 Abstract.
Derwent Abstract Accession No. 85-221406/36, class S01 JP 60-144365 A (Matsushita Elect Works) Jul. 30, 1985 Abstract.
Derwent Abstract Accession No. 67415Y/38, classes A17, L02 JP 52-058750 A (Idemitsu Kosan) May 14, 1977 Abstract.

* cited by examiner

*Primary Examiner*—Patrick H Mackey
*Assistant Examiner*—Mark Hageman
(74) *Attorney, Agent, or Firm*—Young & Thompson

(57) ABSTRACT

In a food processing line, the equipment which is likely to fragment on breakage contains magnetically susceptible particles which are separated from the food by a magnetic separation stage. When the equipment is a starch carrying tray, the molding mix contains 5-50% of magnetic filler, such as magnetite. Reinforcement with glass fiber and jute fiber modifies the compositions for moulding the trays. Molding mixes based on polypropylene and thermosetting resins are described. A processing line using starch trays has a conveyor for food items and a conveyor for the starch in which the food items are molded. Both have magnetic separators.

13 Claims, 3 Drawing Sheets

MOULDING COMPOSITION

FIELD OF THE INVENTION

This invention concerns moulding compositions and articles when moulded from the compositions inter alia for the food industry and a method of removing physical contamination from food.

BACKGROUND OF THE INVENTION

The invention will be described in its application to the food industry, but those skilled in the art will appreciate its applicability to other fields such as pharmaceuticals and mining. The food industry already screens its processes for physical contamination. Metallic parts such as nuts or rivets are easy to remove because metal detectors signal their presence. Plastic parts such as mixer blades, or rubber parts such as O-rings sometimes fail and these may produce fragments of different sizes. This problem is dealt with in U.S. Pat. Nos. 6,113,482 and 6,177,113. Incorporation of stainless steel particles in the machinery components which are susceptible to breakage ensures that the fragments elect a signal from a metal detector in the conveyor on which all products must pass. The detectors which routinely screen the product are tuned to find specific sizes and are calibrated with 1 mm diameter test balls. It is unrealistic to rely on these to detect smaller metal contaminants.

In confectionery making by factory processes, a special problem arises. It is known in to cast jelly confections in cavities pressed into powders such as starch. The starch is laid as a bed in shallow trays which pass through a low temperature oven. After the trays of jelly confections have passed through the oven they are inverted over a sieve for reuse. The inversion and other tray handling operations are performed mechanically, and inevitably a percentage of trays break and fragments contaminate the food. The trays are commonly made of plywood, which dries out with repeated passages through the oven, and if the tray shatters the contamination may affect more than one tray of food. Such failures are a problem and much wholesome food must be discarded to ensure that the result of the failure has been eliminated from the food line and the starch line. The starch in the starch line is recycled continuously and it is imperative to ensure that contaminants are not recycled at the same time. The aim is therefore to remove contaminants before they become embedded in food because then they become more difficult to remove.

A change to thermoset plastic trays which are stronger than plywood has not removed the danger but has exchanged one type of contamination for another. Such thermosetting resins are referred to as sheet moulding compositions (SMC).

SUMMARY OF THE INVENTION

A method aspect of the invention provides a method of detection and removal of contamination due to the failure in use of trays used in the manufacturing process of material intended for human consumption.

The trays upon failure break into fragments releasing chips or particles that contaminate the confections and the starch. The contamination can then be removed by a suitable magnetic field (permanent or electromagnet) and where this is not practicable the contamination can be detected (by a metal detector) and physically removed.

The composition aspect of the invention provides a moulding mix for the trays described above comprising a moulding polymer which includes a filler that renders the item susceptible to a magnetic field.

Preferably the filler is present in a quantity sufficient to make possible the capture or detection of the fragments of the item in the event of breakage.

Thermosets which are already in use are suitable except to say that the prior art mixes do not contain the magnetic ingredient. The mix may also contain one or more fillers, for example mineral fillers having no magnetisable property. These would also be present in somewhat less proportions than is found in commercial mixers because the magnetic component acts as a filler also. The magnetic component may be selected from a group of magnetisable metals, their alloys and their oxides. These are described in the literature. The composition content may comprise magnetic filler 5-30%, resin 15-35%, chopped strand fibreglass 15-35%, and other fillers and additives.

Thus enabling the removal of moulding polymer fragments down to very fine dust that is not otherwise possible with metal detection equipment.

In addition, by loading the moulding polymer with up to 50% by wt of magnetic filler in the event that by some means a chip of the moulding polymer mixed with magnetic filler is embedded in a solid piece of food, or packaged into a bag prior to sale, significantly smaller pieces can be detected than would otherwise be possible.

In the invention, magnetic oxides or ferrites have a mean particle size of 20-50 $\mu$ or finer. The method can include passing the food over tube magnets and plate magnets to enable magnetic separation of the fragments from the food. The fragments that break can be from a conveyor bucket, roller or guide and equipment housings.

The apparatus aspect of the invention provides a tray or carrier for ingredients used inter alia in the food industry made from a moulding mix as described above.

DETAILED DESCRIPTION WITH RESPECT TO THE DRAWINGS

Figure 1:
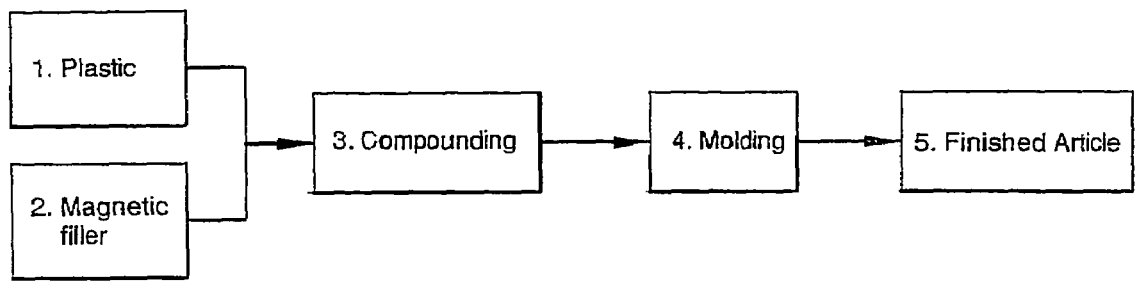
FIG. 1 is a simplified block diagram of the fabrication process for forming a moulding from a plastic material containing the magnetic filler.

In FIG. 1, the liquid polymer resin is compounded with the particulate fillers and moulded between the heated platens of a compression die. The proportions indicated below suit thermosetting resins also and these require curing periods of about 5 minutes at 150° C. A commercial formulation can be modified by the supplier, such as ASTAR S.A., who may substitute a requested filler for a standard filler, eg. magnetisable filler. As a percentage of the composition 10-50% is magnetisable, whereas the remaining ingredients including polymer are from 20-30%. If glass fibre is unsuitable, it is preferable to substitute an organic vegetable fibre.

Starch trays for confectionery making are moulded from compositions made to the following formulation:

EXAMPLE 1

| | |
|---|---|
| Polyester resin | 25% |
| Chopped strand glass | 25% |
| Magnetic filler | 10% |
| Other fillers and additives | 40% |

EXAMPLE 2

| | |
|---|---|
| Polyester resin | 34% |
| Jute fibres | 26% |
| Magnetic filler (magnetite) | 17% |
| Other fillers and additives | 23% |

Both types of filler are mixed with the resin. The jute fibres are laid up as a mat 6 mm thick and immersed in the resin/filler mix. Excess is drained and the soaked mat is laid in the die cavity with the edges of the mat brought to the die edges. The die is closed and cured for 5 minutes at 150° C. The resulting tray weighs 3.5 kg and measures 800×400 mm.

In a variant, the shedding of fibres as a result of breakage is suppressed by placing on top of the wet mat a layer of woven fabric which has also been soaked in the same polymer/filler mix.

If thermoplastic trays are required, injection moulding is used instead with no reinforcement, only fillers are incorporated into the injected material.

EXAMPLE 3

| | |
|---|---|
| Talc filled polypropylene resin | 84% |
| Magnetic filler | 16% |

Trays moulded from this composition are much less brittle than trays made from thermosetting resin and tend not to chip. Accordingly, the fragments are larger and are completely collected by an electromagnet.

While strength is improved, shrinkage and distortion are reduced by the addition of a small quantity of glass fibre.

EXAMPLE 4

| | |
|---|---|
| Talc filled pp | 74% |
| Magnetite | 16% |
| Glass fibre | 10% |

Magnetite is mined, ground and dried similar to talc, calcium carbonate and other minerals used in the plastics industry as fillers. It is available as a very fine powder with a mean particle size of 20 microns or finer and has a specific gravity range of about 5.0. Other particles may be used which also have a strong attraction to magnets, these include magnetisable metals, their alloys, their oxides and ferrites. The type of magnetic filler used is dependant on the application, consideration of cost and processing considerations.

Figure 2:
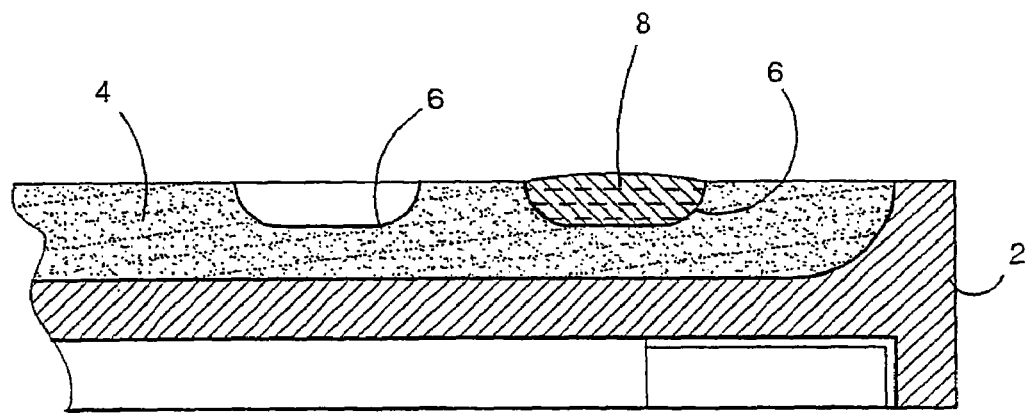
FIG. 2 is a cross section of a fragment of a starch moulding tray.

Referring now to FIG. 2, the tray 2 is approximately 800× 350×30 mm and is moulded in a compression die and cured between a pair of heated platens (not shown).

Figure 3:
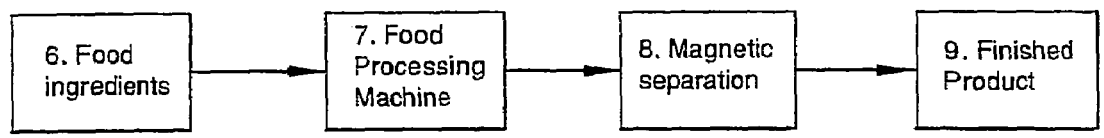
FIG. 3 is a simplified block diagram representing a food processing line that may utilise a plastic material containing the magnetic filler.

FIG. 3 is a generic block diagram representation of a food processing line, including food processing equipment, having one or more plastic components manufactured from a plastic material with a magnetic filler as shown in FIG. 1. A foodstuff and associated carriers is carried by the equipment. During this process, a breakage may occur resulting in the contamination of the foodstuff or carriers in contact with the foodstuff. The foodstuff or carriers in contact with the foodstuff is then passed through magnetic separation equipment.

Figure 4:
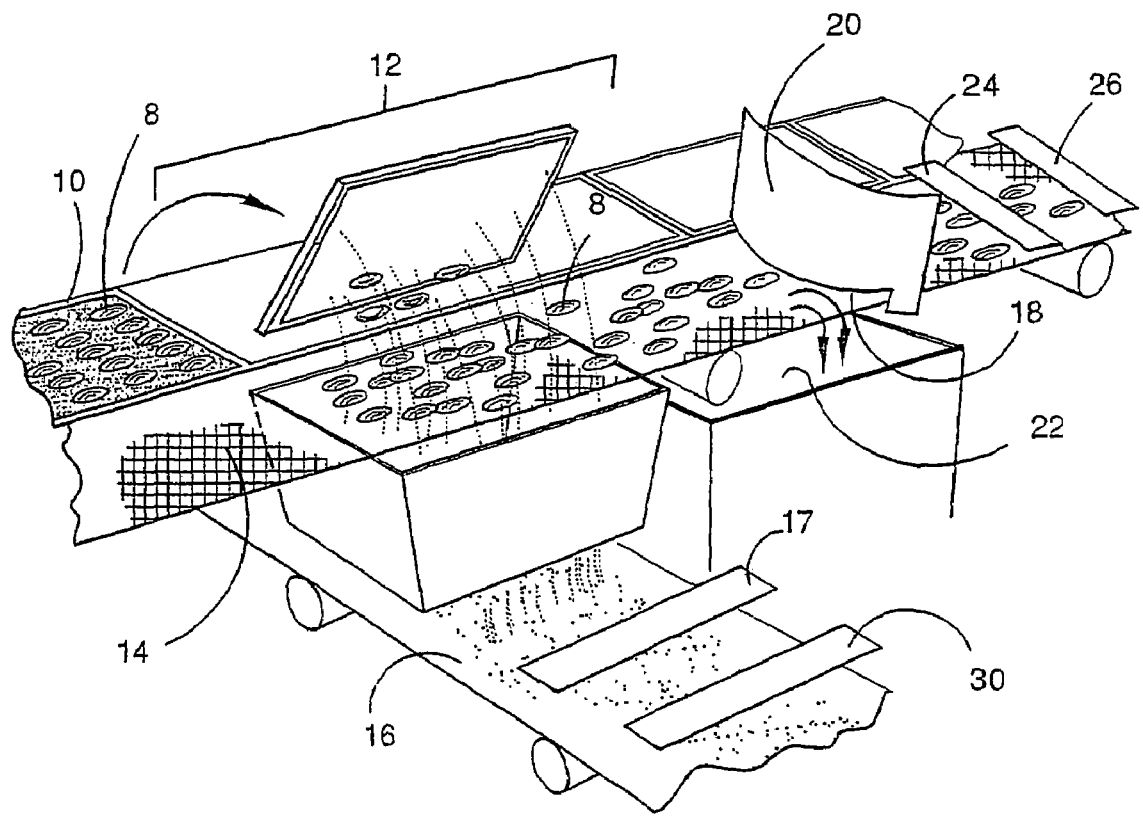
FIG. 4 is a diagrammatic perspective of a confectionery manufacturing process which utilises starch mogul technology.
Figure 5:
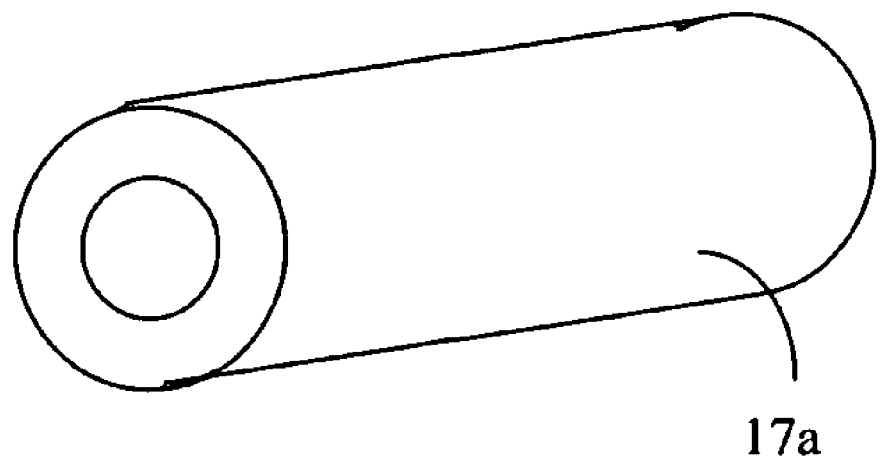
FIG. 5 shows a tube magnet and a plate magnet suitable for magnetic separation.
Figure 5:

Referring now to FIG. 4, in a confectionery factory, the trays 2 are filled with powdered starch 4 and multiple cavities 6 are pressed into the compacted starch. Jelly items 8 are deposited in the cavities in a known manner. After baking, the trays emerge on conveyer 10 and travel to the transfer station 12 where a mechanical tipper inverts the tray and replaces it on conveyor 10. It is at this station 12 that the trays may break. The jelly items and starch fall onto a suitable screen 14 that separates the starch from the jellies. The starch collects onto conveyor 16 any chips of tray material which pass along the conveyor 16 with the starch reach magnetic separator 17 which removes them. As shown in FIG. 5, the magnetic separator can include at least one tube magnet 17a or at least one plate magnet 17b.

The jelly items transferred along conveyor 15 are advanced towards gate 18. This has a horizontal slot 20 which allows the jelly items to pass, but if the tray shatters, the fragments are directed to bin 22. Any chips of tray material which pass along the conveyor with the product reach the magnetic separator 24 which removes more of the tray. Any additional chips of tray that may be adhered to the jellies can be detected by a magnetic field (metal detector) 26 and the jelly and contamination physically separated by rejecting the packet containing the offending jelly.

The dumped starch travels to the reuse area via conveyor 28. Contaminating chips are removed by magnet 30.

I have found the advantages of the above embodiment to be:
1. Reduces customer complaints about unexpected inclusions in the product.
2. Reduces litigious claims in respect of product contamination.
3. Static electricity controls need to be considered for the transfer of dry starch since finely divided dusts in air present an explosive hazard. By the addition of an additive to make the trays dissipate static, the risks to plant and personnel are reduced.

It is to be understood that the word "comprising" as used throughout the specification is to be interpreted in its inclusive form, ie. use of the word "comprising" does not exclude the addition of other elements.

It is to be understood that various modifications of and/or additions to the invention can be made without departing from the basic nature of the invention. These modifications and/or additions are therefore considered to fall within the scope of the invention.

The claim defining the invention are as follows:
1. A method of separating fragments following breakage of plastic equipment in a food processing line, the equipment being made from a plastic moulding composition which contains magnetic oxides or ferrites capable of separating by magnetic separation by either magnetic separator (magnets) or magnetic detection (metal detection), comprising:

exposing food items contaminated with loose fragments of the moulded equipment to a magnetic separator or magnets and separation by magnetic attraction the fragments from the food items; and exposing the food items contaminated with fragments either packaged or embedded in the food of the moulded equipment to a magnetic detector (metal detection equipment) and separating by rejecting the food detected as containing the offending food product contaminated with detectable particles, thereby recovering the food free of contamination, wherein a dry carrier material is utilized for conveying the food items which is continuously recycled, exposing the dry carrier to a magnetic separator for removing fragments of the moulded equipment thereby recovering the dry carrier material free of contamination, and wherein the magnetic oxides and ferrites are capable of separation by magnetic separation, and the magnetic oxides and ferrites are provided in the moulding composition for the equipment of the food processing line in a concentration of 20-50% by weight of the moulded equipment to enable the removal of moulding polymer fragments by the magnetic separator and fragments to be detected by magnetic detection that may be embedded in the food or contained in packaged food.

2. The method according to claim 1, wherein the magnetic oxides or ferrites are in particulate form.

3. The method according to claim 1, wherein the magnetic oxides or ferrites comprise magnetite.

4. The method according to claim 1, wherein the magnetic oxides or ferrites have a mean particle size of 20-50 μ or finer.

5. The method according to claim 1, wherein the moulding composition includes plastic polymeric materials, additives or reinforcements.

6. The method according to claim 1, wherein the food is a confectionary and the dry carrier material is starch.

7. The method according to claim 1, further comprising passing the food over tube magnets and plate magnets to enable magnetic separation of the fragments from the food.

8. The method according to claim 1, wherein the plastic moulding composition containing magnetic particles is moulded into articles that could contaminate a food processing line and require the fragments to be removed by a magnetic separation stage.

9. The method according to claim 1, wherein the equipment fragments that break are from a crate or tray for confectionary items.

10. The method according to claim 1, wherein the fragments that break are from a conveyor bucket, roller or guide and equipment housings.

11. The method according to claim 1, wherein the food items pass over a magnetic separator that is a plate magnet.

12. The method according to claim 1, wherein the dry carrier material pass over a magnetic separator by dropping through an array of tube magnets.

13. The method according to claim 1, wherein the plastic moulding composition containing the magnetic oxides and ferrites is moulded into articles that could contaminate a food processing line and require the fragments to be removed by a magnetic separation stage.

* * * * *